United States Patent

Ball et al.

Patent Number: 5,114,665
Date of Patent: May 19, 1992

[54] AUTONORMALIZING REACTIMETER

[75] Inventors: Russell M. Ball, Lynchburg; John J. Madaras, Forest, both of Va.

[73] Assignee: The Babcock & Wilcox Company, New Orleans, La.

[21] Appl. No.: 557,892

[22] Filed: Jul. 25, 1990

[51] Int. Cl.$^5$ .......................................... G21C 17/104
[52] U.S. Cl. ..................... 376/255; 376/254
[58] Field of Search ............... 376/241, 242, 254, 255, 376/216

[56] References Cited

U.S. PATENT DOCUMENTS

| | | | |
|---|---|---|---|
| 3,188,470 | 6/1965 | Ricker et al. | 250/83.1 |
| 4,263,654 | 4/1981 | Fukuzaki et al. | 364/504 |
| 4,277,308 | 7/1981 | Rusch et al. | 176/19 EC |
| 4,399,095 | 8/1983 | Morris | 376/216 |
| 4,920,548 | 4/1990 | Gaussa, Jr. et al. | 376/255 |

OTHER PUBLICATIONS

Lovallo, J. M. and Worsham, H. J., "A Fast Digital Reactivity Calculation and Logging System", IEEE, NS-19(1), pp. 837-839, Feb. 1972.

Keepin, G. Robert, "Physics of Nuclear Kinetics", Addison-Wesley, pp. 282-290, 1965.

Pettus, W. G. and Revkin, S. B., "Development of Digital Reactivity Meter Status Report", BAW-TM 464, Jun. 12, 1969.

*Primary Examiner*—Brooks H. Hunt
*Assistant Examiner*—Chrisman D. Carroll
*Attorney, Agent, or Firm*—Vytas R. Matas; Robert J. Edwards; Daniel S. Kalka

[57] ABSTRACT

A method of measuring reactivity of a nuclear reactor includes automatic normalization. Normalization is achieved by determining the ratio of a linear amplifier used to form an analog detection signal, before and after a range change has taken place. A normalization factor is calculated according to this ratio which is applied to a delay neutral precursor concentration used for calculating the reactivity period.

4 Claims, 2 Drawing Sheets

AUTONORMALIZING REACTIMETER

FIELD AND BACKGROUND OF THE INVENTION

The present invention relates in general to equipment and techniques for monitoring the conditions in a nuclear reactor, and in particular to a new and useful method for measuring reactivity in a reactor which is automatically normalized during range changes.

It is known that neutron population is related to reactivity and kinetic equations have been developed to measure neutron populations.

The use of an integral form for reactor kinetic equations to compute reactivity from neutron population information has been described in various publications on nuclear reactor kinetics, for example *"Physics of Nuclear Kinetics"* by G. R. Keepin, Addison-Wesley, 1965.

A portable digital system for rapid on-line calculations of reactivity during nuclear plant physics testing is disclosed in *"Development of Digital Reactivity Meter Status Report"* by W. G. Pettus and S. B. Revkin, BAW-TM-464, Jun, 12, 1969. Also see "A Fast Digital Reactivity Calculation and Logging System" by J. M. Lovall and H. J. Worsham, IEEE, NS-19(1) pp. 837-839, February 1972.

Babcock & Wilcox (a McDermott Company) has constructed, used and sold a system using a small digital computer for on-line determinations of reactivity. In this system, renormalization factors between ranges were determined from measurements on a linear amplifier. These factors were then introduced into the digital program of the computer, to be used whenever a range change occurred. This required the storage of numbers corresponding to a calibration of the amplifier and measured range ratios. The use of such pre-stored numbers introduced inaccuracy into the normalization factors, caused by improper calibration or drift in the amplifier system during use. This resulted in "jumps" in the indicated reactivity during actual tests conducted on nuclear reactors.

SUMMARY OF THE INVENTION

The present invention utilizes sampled information before and after a range change on a linear amplifier, to determine the ratios of the two ranges. In order to compensate for the change in value of the "before ranging" level at the time of the "after ranging" sample, an algorithm of the present invention extrapolates the "before ranging" value, one time step to coincide in time with the "after ranging" value. Thus, the normalization factors to be applied to delayed neutron precursor concentrations utilized for measuring reactivity, and required for the "after ranging" calculation, are exact in time and value.

This avoids the pre-calibration and pre-stored numbers of the prior art. The algorithm of the present invention is thus simplified. The prior inaccuracies which resulted in "jumps" in measuring reactivity are avoided by the present invention which provides indications that are continuous and smooth.

The present invention can be implemented on a variety of small computers including minicomputers or PC type microcomputers.

DESCRIPTION OF THE PREFERRED EMBODIMENT

Figure 1:
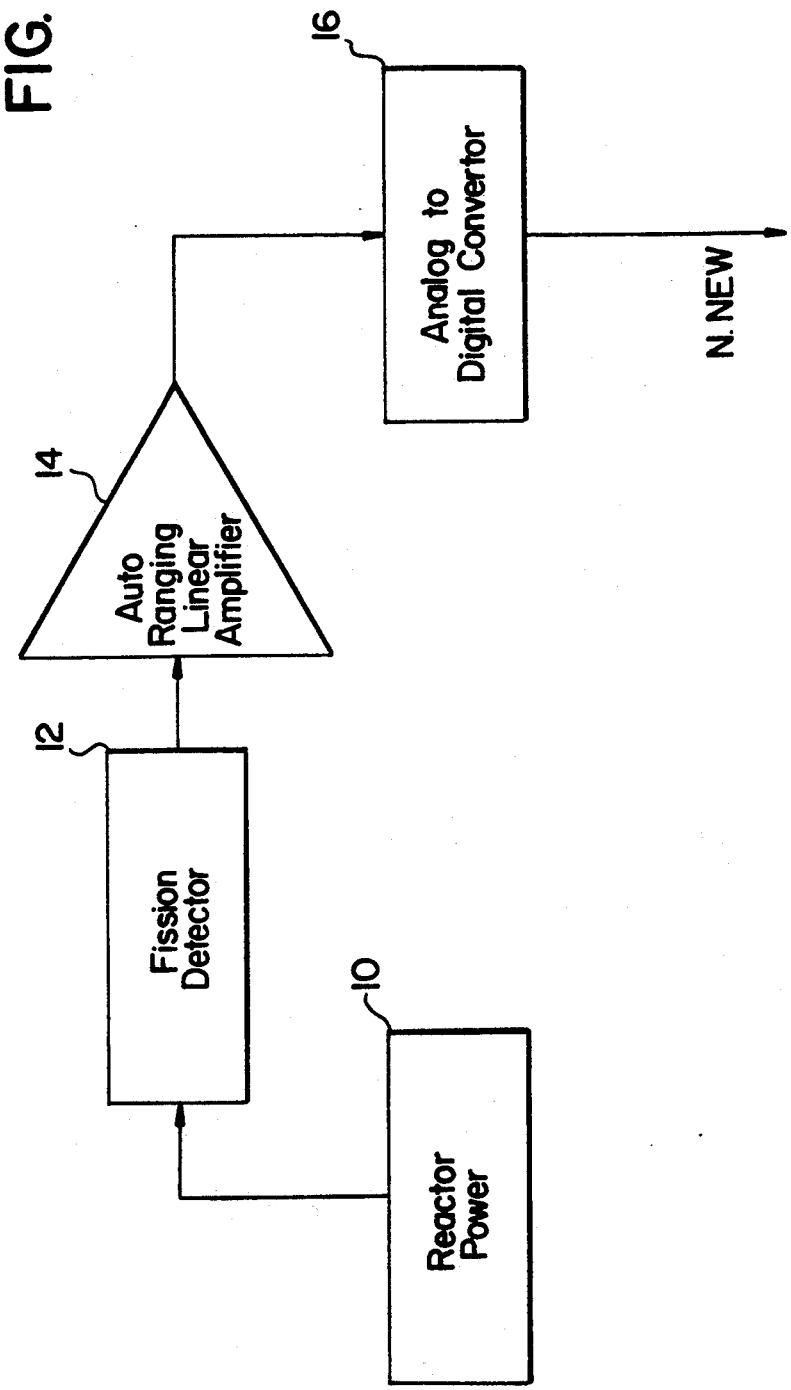
FIG. 1 is block diagram showing a system which can be used to practice the present invention.

Referring to the drawings in particular, the invention embodied therein comprises a method of measuring reactivity in a nuclear reactor which smoothly and continuously compensates for range changes in an autoranging linear amplifier used in apparatus to practice the invention.

FIG. 1 illustrates the physical system used to practice the invention. Reactor power 10 from the core of the nuclear reactor is measured by a fission detector 12 which detects neutron population being generated by the reactor power. A signal from the fission detector 12 is supplied to an autoranging linear amplifier 14 whose analog output is converted to a digital signal in an analog-to-digital-convertor 16. The digital signal labeled N.NEW is supplied to a computer according to the present invention which is programmed to rapidly and repeatedly conduct the algorithm illustrated in FIG. 2.

Convertor 16 is set to convert signals at a sample interval T measured in seconds and being for example 0.2 seconds.

Figure 2:
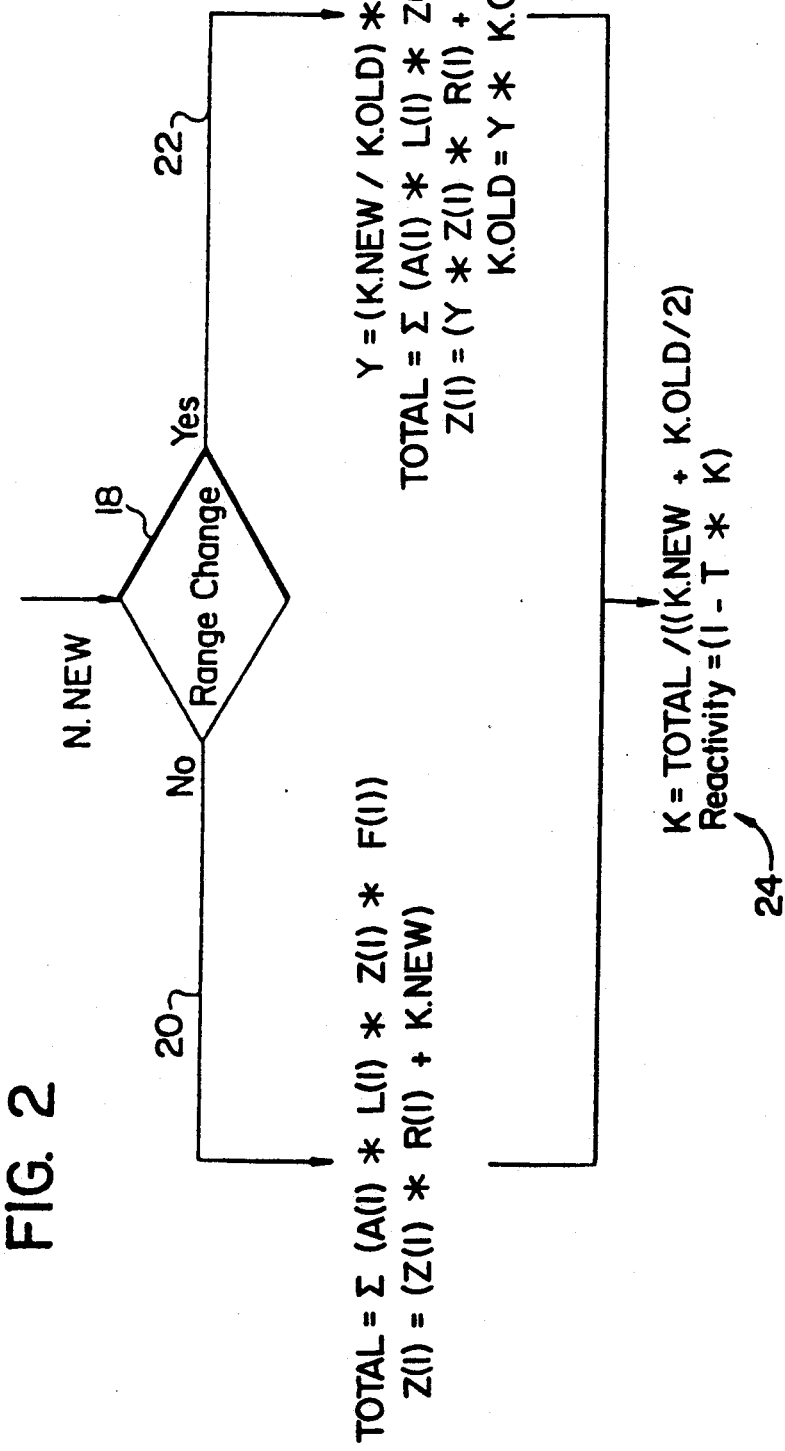
FIG. 2 is a flow chart showing the algorithm of the present invention.

As shown in FIG. 2, a determination is first made at 18 whether a range change in the linear amplifier 14 has taken place for the digital signal N.NEW. If not, the signal is processed over line 20 to calculate reactivity on the basis of a current N.NEW signal.

If a range change is detected at 18, processing continues along line 22 where autonormalization according to the present invention is practiced before yielding the reactivity measurement at 24.

In FIG. 2, the various parameters have the following meaning:

A(I) are the relative delay fractions;
L(I) are the delay neutron lifetimes (sec.);
T is the sample interval (sec.); and
K.NEW, K.OLD, K.OLD.OLD are the current and the two most recent sample histories respectively.

Initialization of the reactimeter of the present invention is achieved using the following relationships:

$$R(I) = Exp(-L(I)*T);$$

$$F(I) = (1 - R(I))/(L(I)*T);$$

$$X(I) = R(I)/(1 - R(I));$$

$$K.OLD.OLD = K.OLD = K.NEW; \text{ and}$$

$$Z(I) = K.OLD*X(I) + K.OLD.$$

Where no range change has been sensed, the algorithm on line 20 calculates total current sample history TOTAL by taking the summation of all the products of the relative delay fractions times the delay neutron lifetimes times Z(I) times F(I). The value Z(I) is related to the value R(I) and the current sample history (K.NEW) as shown in FIG. 2, while F(I) is related to R(I), the delay neutron lifetime and the sample interval as shown above.

If a range change is detected at 18, the total sample history TOTAL is the summation of the product shown on the left in FIG. 2, times an additional factor Y which is calculated as the product of two ratios, the first being the ratio between the current sample history K.NEW and the first most recent sample history K.OLD, times the ratio between the second most recent sample history K.OLD.OLD and the first most recent sample history K.OLD. Reactivity is then found at 24 as one minus the product of the sample interval T times the value K which is calculated as the ratio between the total sample history TOTAL divided by the average between the current sample history K.NEW and the first most recent sample history K.OLD. The value Y thus represents a delayed neutron precursor concentration which is applied to normalize the calculation for reactivity when a range change has occurred.

While a specific embodiment of the invention have been shown and described in detail to illustrate the application of the principles of the invention, it will be understood that the invention may be embodied otherwise without departing from such principles.

What is claimed is:

1. A method for measuring reactivity of a nuclear reactor which smoothly and continuously compensates for range changes, comprising:

detecting fission products from the nuclear reactor to form a detection signal;

amplifying the detection signal in a linear amplifier having a plurality of ranges for amplifying detection signals of different amplitudes, to generate an analog signal;

sampling the analog signal at a selected sample interval (T) to form a digital signal (N.NEW) having a current sample history (K.NEW);

storing a first most recent sample history (K.OLD) and a second most recent sample history (K.OLD.OLD);

determining whether a range change has occurred during amplifying of the detection signal, between the current sample history (K.NEW) and the first most recent sample history (K.OLD), and establishing a first signal indicative of no range change or in the alternative a second signal indicative of a range change; and calculating reactivity, in accordance with the first or second signals, the first signal calculating reactivity as a function of the current (K.NEW) and first most recent sample history (K.OLD)

the second signal calculating reactivity as a function of the current sample history (K.NEW) and the first most recent sample history (K.OLD) times a normalization factor (Y) which is equal to the product of the current sample history (K.NEW) divided by the first most recent sample history (K.OLD), times the second most recent sample history (K.OLD.OLD) divided by the first most recent sample history (K.OLD) for avoiding inaccuracies in measuring reactivity.

2. A method according to claim 1 wherein the fission products are neutrons, reactivity being a function of a relative delay fraction produced by the sample interval and a delay neutron time for neutrons from the nuclear reactor.

3. A method according to claim 2, wherein the first signal calculating step includes calculating total current sample history with a summation of all products of relative delay fractions times delay neutron lifetimes times Z(I) times F(I).

4. A method according to claim 2, wherein the second signal calculating step includes calculating total sample history times the additional factor (Y).

* * * * *